United States Patent
Lummerstorfer et al.

(10) Patent No.: US 11,186,708 B2
(45) Date of Patent: Nov. 30, 2021

(54) POLYPROPYLENE COMPOSITION WITH OUTSTANDING IMPACT PERFORMANCE

(71) Applicant: BOREALIS AG, Vienna (AT)

(72) Inventors: Thomas Lummerstorfer, Linz (AT); Claudia Kniesel, Linz (AT); Georg Grestenberger, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 16/620,825

(22) PCT Filed: Jun. 26, 2018

(86) PCT No.: PCT/EP2018/067071
§ 371 (c)(1),
(2) Date: Dec. 9, 2019

(87) PCT Pub. No.: WO2019/002270
PCT Pub. Date: Jan. 3, 2019

(65) Prior Publication Data
US 2020/0181378 A1    Jun. 11, 2020

(30) Foreign Application Priority Data

Jun. 29, 2017 (EP) .................................. 17178711

(51) Int. Cl.
| | |
|---|---|
| C08L 23/08 | (2006.01) |
| C08L 23/12 | (2006.01) |
| C08L 23/20 | (2006.01) |
| C08L 23/16 | (2006.01) |

(52) U.S. Cl.
CPC ........... *C08L 23/12* (2013.01); *C08L 23/0815* (2013.01); *C08L 23/16* (2013.01); *C08L 23/20* (2013.01); *C08L 2205/025* (2013.01); *C08L 2205/03* (2013.01); *C08L 2205/22* (2013.01); *C08L 2207/02* (2013.01)

(58) Field of Classification Search
CPC ................................................ C08L 2207/02
See application file for complete search history.

(56) References Cited

U.S. PATENT DOCUMENTS

| | | | |
|---|---|---|---|
| 5,272,236 A | 12/1993 | Shih-Yaw et al. | |
| 2002/0035209 A1 | 3/2002 | Susumu et al. | |
| 2015/0299443 A1* | 10/2015 | Tranninger | C08F 210/06 524/528 |

FOREIGN PATENT DOCUMENTS

| | | |
|---|---|---|
| EP | 887379 A1 | 12/1998 |
| EP | 887380 A1 | 12/1998 |
| EP | 887381 A1 | 12/1998 |
| EP | 0946640 B1 | 2/2002 |
| EP | 0991684 B1 | 1/2006 |
| EP | 2610271 A1 | 7/2013 |
| EP | 2610272 A1 | 7/2013 |
| EP | 2610273 A1 | 7/2013 |
| EP | 2738215 A1 | 6/2014 |
| JP | 9-40821 A | 2/1997 |
| JP | 9-227735 | 9/1997 |
| JP | 2012-207154 A | 10/2012 |
| KR | 10-2006-0126632 | 12/2006 |
| KR | 10-2007-0051841 | 5/2007 |
| WO | 92/12182 A1 | 7/1992 |
| WO | 99/24478 A1 | 5/1999 |
| WO | 99/24479 A1 | 5/1999 |
| WO | 00/68315 A1 | 11/2000 |
| WO | 2004/000899 A1 | 12/2003 |
| WO | 2004035681 A2 | 4/2004 |
| WO | 2004/111095 A1 | 12/2004 |
| WO | 2005/044911 A1 | 5/2005 |
| WO | 2005/123827 A1 | 12/2005 |
| WO | 2007/060114 A1 | 5/2007 |
| WO | 2012/007430 A1 | 1/2012 |

OTHER PUBLICATIONS

Korean Office Action dated Oct. 6, 2020.
Japanese Office Action dated Dec. 1, 2020.
Busico, et al., "Microstructure of polypropylene", Prog. Polym. Sci. 26 (2001) pp. 443-533.
Busico, et al., "Alk-1-ene Polymerization in the Presence of a Monocyclopentadienyl Zirconium(IV) Acetamidinate Catalyst: Microstructural and Mechanistic Insightsa", Macromol. Rapid Commun. 2007, 28, pp. 1128-1134.
Busico, et al., "Full Assignment of the 13C NMR Spectra of Regioregular Polypropylenes: Methyl and Methylene Region", Macromolecules 1997, 30, 6251-6263.
Castignolles, et al., "Detection and quantification of branching in polyacrylates by size-exclusion chromatography (SEC) and melt-state 13C NMR spectroscopy", Polymer 50 (2009) 2373-2383.
H. N. Cheng, "I3C NMR Analysis of Ethylene-Propylene Rubbers", Macromolecules 1984, 17, 1950-1955.
European Search report for Patent Application No. 17178711.2-1302, dated Nov. 17, 2017.
Filip, et al., "Heteronuclear decoupling under fast MAS by a rotor-synchronized Hahn-echo pulse train", Journal of Magnetic Resonance 176 (2005) 239-243.
Griffin, et al., "Low-load rotor-synchronised Hahn-echo pulse train (RS-HEPT) 1H decoupling in solid-state NMR: factors affecting MAS spin-echo dephasing times", Magn. Reson. Chem. 2007; 45: S198-S208.
Zweifel, et al., "Plastics Additives Handbook", 6th Edition, Department of Materials, Institute of Polymers, 2009, pp. 1141-1190.
Klimke, et al., "Optimisation and Application of Polyolefin Branch Quantification by Melt-State 13C NMR Spectroscopy", Macromol. Chem. Phys. 2006, pp. 382-395.

(Continued)

*Primary Examiner* — Richard A Huhn
(74) *Attorney, Agent, or Firm* — Tarolli Sundheim, Covell & Tummino LLP

(57) ABSTRACT

The present invention is directed to a polypropylene composition (C) comprising a polypropylene matrix, a dispersed phase comprising two different elastomeric ethylene copolymers and an inorganic filler. The present invention is further directed to an article comprising said polypropylene composition (C).

14 Claims, No Drawings

(56) References Cited

OTHER PUBLICATIONS

Parkinson, et al., "Effect of Branch Length on 13C NMR Relaxation Properties in Molten Poly[ethylene-co-(a-olefin)] Model Systems", 2007, pp. 21828-21833.
Zweifel, et al., "Plastics Additives Handbook", 5th Edition, Department of Materials, Institute of Polymers, 2001.
Pollard, et al., "Observation of Chain Branching in Polyethylene in the Solid State and Melt via 13C NMR Spectroscopy and Melt NMR Relaxation Time Measurements", Macromolecules 2004, pp. 813-825.
James C. Randall, "A Review of High Resolution Liquid 13Carbon Nuclear Magnetic Resonance Characterizations of Ethylene-Based Polymers", C29 201, 1989.
Resconi et al., "Selectivity in Propene Polymerization with Metallocene Catalysts", Chem. Rev. 2000, 100, pp. 1253-1345.
Frank, et al., "GS-VIII : OP18 New Measurement Method for Appearance of Flow Marks or Tiger Stripes Defect for Improved Quantification and Analysis", pp. 25, Mar. 15, 2009.
Wang et al., "Structural Analysis of Ethylene/Propylene Copolymers Synthesized with a Constrained Geometry Catalyst", Macromolecules 2000, 33, pp. 1157-1162.
Zhou et al., "A new decoupling method for accurate quantification of polyethylene copolymer composition and triad sequence distribution with 13C NMR", Journal of Magnetic Resonance 187 (2007) pp. 225-233.
Applicant: Borealis AG; European Office Action dated Apr. 23, 2021; 4 pgs.

* cited by examiner

POLYPROPYLENE COMPOSITION WITH OUTSTANDING IMPACT PERFORMANCE

The present invention is directed to a polypropylene composition (C) comprising a polypropylene matrix, a dispersed phase comprising two different elastomeric ethylene copolymers and an inorganic filler. The present invention is further directed to an article comprising said polypropylene composition (C).

Polypropylene materials are widely used in the automotive industry and their very basic property profile is usually described by density, flowability, stiffness and impact strength. At a given density and melt flow rate, an excellent stiffness-impact balance is frequently requested, especially for more demanding automotive interior and exterior applications. This is usually achieved by the preparation of ternary compositions combining a polypropylene matrix, a filler and a dispersed elastomeric phase. According to this approach, both stiffness and impact strength are improved simultaneously whereupon a well-balanced mechanical property profile is obtained. The balance between stiffness and impact strength is often delicate as high impact strength leads to a significant reduction of stiffness and vice versa.

The problem becomes even more severe for very demanding automotive interior and exterior specifications where the ductile-brittle transition behavior is of high importance. For such materials, impact requirements are extended to tests known as instrumented puncture tests (IPT) or falling dart impact tests. Usually, a flat specimen geometry is used and a biaxial loading is imposed by a hemispherical dart which hits the rigidly supported specimen at a defined test speed and test temperature. The dynamic response of the material (force-deflection curves) is recorded and several parameters can be used for evaluation. Ductile-brittle transitions of materials can be measured this way by conducting instrumented puncture tests over a given temperature range. The instrumented puncture test standards mainly used in the automotive industry are ISO 6603-2 and ASTM D3763 and the brittle-ductile transition temperature ($T_{BDT}$) is requested in many specifications. The evaluation of $T_{BDT}$ is usually based on the appearance of the specimen after the IPT test.

One approach to improve the ductile-brittle behavior of a polypropylene material is the application of styrene-based elastomeric polymers (SEBS) as impact modifiers. The reason for the outstanding IPT performance of SEBS modified compounds is on the one hand the very fine and uniform phase morphology of the dispersed SEBS phase in the polypropylene matrix and on the other hand the very low glass transition point of the SEBS grades used for impact modification of automotive compounds. However, the rather high cost of such SEBS grades are a major drawback of this approach.

Accordingly, there is a need in the art for a polypropylene material showing an improved balance between stiffness and impact strength accompanied by an excellent ductile-brittle behavior without the application of SEBS based polymers.

Therefore, it is an object of the present invention to provide a polypropylene composition featured by a good IPT performance while the tensile strength and notched impact strength remain on a high level.

The finding of the present invention is that the application of an impact modifier being a propylene rich elastomer leads to an improved balance between impact and stiffness as well as a good IPT performance.

Accordingly, the present invention is directed to a polypropylene composition (C), having a melt flow rate $MFR_2$ (230° C., 2.16 kg) determined according to ISO 1133 of at least 10.0 g/10 min, comprising i) 45.0 to 80.0 wt.-% of a matrix (M) comprising a propylene polymer (PP1),
ii) 15.0 to 40.0 wt.-% of an elastomeric fraction (E) dispersed within said matrix (M), comprising
   a) a first elastomeric ethylene copolymer (E1) having an ethylene content of at least 30.0 mol-%, and
   b) a second elastomeric ethylene copolymer (E2) having an ethylene content equal or below 30.0 mol-%,
and
iii) an inorganic filler (F).

According to one embodiment of the present invention, the elastomeric fraction (E) comprises the first elastomeric ethylene copolymer (E1) and the second elastomeric ethylene copolymer (E2) in a weight ratio of 2:1 to 10:1.

According to another embodiment of the present invention, the polypropylene composition (C) comprises
i) 45.0 to 75.0 wt.-% of the propylene polymer (PP1),
ii) 10.0 to 40.0 wt.-% of the first elastomeric ethylene copolymer (E1),
iii) 0.5 to 10.0 wt.-% of the second elastomeric ethylene copolymer (E2), and
iv) 15.0 to 30.0 wt.-% of the inorganic filler,
based on the overall amount of the polypropylene composition (C).

According to a further embodiment of the present invention, the propylene polymer (PP1)
i) is a propylene homopolymer (H-PP) and/or
ii) has a melt flow rate $MFR_2$ (230° C., 2.16 kg) determined according to ISO 1133 in the range of 20.0 to 200.0 g/10 min.

It is especially preferred that the first elastomeric ethylene copolymer (E1) is a copolymer of ethylene and a C4 to C20 α-olefin.

According to one embodiment of the present invention, the first elastomeric ethylene copolymer (E1) has
a) a melt flow rate MFR (190° C., 2.16 kg) measured according to ISO 1133 below 100.0 g/10 min,
b) a C4 to C20 α-olefin content, based on the total weight of the first elastomeric ethylene copolymer (E1), in the range of 5.5 to 30.0 mol-%, and/or
c) a density below 0.885 g/cm$^3$.

According to another embodiment of the present invention, the first elastomeric ethylene copolymer (E1) is a copolymer of ethylene and 1-butene or 1-octene.

It is especially preferred that the second ethylene copolymer (E2) is a copolymer of propylene and ethylene.

According to one embodiment of the present invention, the second ethylene copolymer (E2) has
a) a propylene content of at least 60.0 mol-%,
b) a density below 0.870 g/cm$^3$, and/or
c) a melt flow rate MFR (190° C., 2.16 kg) measured according to ISO 1133 in the range of 0.5 to 15.0 g/10 min.

According to another embodiment of the present invention, the inorganic filler (F) is talc.

It is especially preferred that the first elastomeric ethylene copolymer (E1) and the second ethylene copolymer (E2) do not contain monomer units derivable from styrene or derivatives thereof.

The present invention is further directed to an article, comprising the polypropylene composition (C) as described above.

It is especially preferred that the article is a moulded article, preferably a moulded automotive article.

Preferably, the article comprises at least 60.0 wt.-% of the polypropylene composition (C) as described above.

In the following, the present invention is described in more detail.

The polypropylene composition (C)

As outlined above, the polypropylene composition (C) according to the instant invention comprises a matrix (M) being a propylene polymer (PP1) and an elastomeric fraction (E) comprising a first elastomeric ethylene copolymer (E1) and a second elastomeric ethylene copolymer (E2).

Accordingly, it is preferred that the polypropylene composition (C) is a heterophasic system comprising a crystalline matrix (M) being the propylene polymer (PP1) and a dispersed phase being the elastomeric fraction (E) comprising the first elastomeric ethylene copolymer (E1) and the second elastomeric ethylene copolymer (E2). Accordingly, the propylene polymer (PP1) is preferably a (semi)crystalline propylene polymer (PP1) and the first elastomeric ethylene copolymer (E1) and the second elastomeric ethylene copolymer (E2) are elastomeric polymers (finely) dispersed in the (semi)crystalline propylene polymer (PP1). In other words the (semi)crystalline propylene polymer (PP1) constitutes a matrix in which the the elastomeric fraction (E) comprising the first elastomeric ethylene copolymer (E1) and the second elastomeric ethylene copolymer (E2) forms inclusions in the matrix, i.e. in the (semi)crystalline propylene polymer (PP1). Thus the matrix contains (finely) dispersed inclusions being not part of the matrix and said inclusions contain the elastomeric fraction (E) comprising the first elastomeric ethylene copolymer (E1) and the second elastomeric ethylene copolymer (E2). The term "inclusion" according to this invention shall preferably indicate that the matrix and the inclusion form different phases within the polypropylene composition (C), said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

It is preferred that the polypropylene composition (C) comprises 45.0 to 80.0 wt.-%, more preferably 47.0 to 65.0 wt.-%, still more preferably 50.0 to 55.0 wt.-% of the matrix (M) and 15.0 to 40.0 wt.-%, more preferably 20.0 to 35.0 wt.-%, still more preferably 25.0 to 30.0 wt.-% of the elastomeric fraction (E), based on the overall weight of the polypropylene composition (C).

Additionally or alternatively to the previous paragraph, it is preferred that the polypropylene composition (C) comprises the matrix (M) and the elastomeric fraction (E) in a weight ratio of 5:1 to 1:1, more preferably 3:1 to 1.5:1, still more preferably 2:1 to 1.8:1.

Further, the inventive polypropylene composition comprises an inorganic filler (F).

Accordingly, it is preferred that the polypropylene composition (C) comprises 45.0 to 80.0 wt.-%, more preferably 47.0 to 65.0 wt.-%, still more preferably 50.0 to 55.0 wt.-% of the matrix (M), 15.0 to 40.0 wt.-%, more preferably 20.0 to 35.0 wt.-%, still more preferably 25.0 to 30.0 wt.-% of the elastomeric fraction (E) and 10.0 to 30.0 wt.-%, more preferably 15.0 to 25.0 wt.-%, still more preferably 17.0 to 22.0 wt.-% of the inorganic filler (F), based on the overall weight of the polypropylene composition (C).

As outlined above, the polypropylene composition (C) comprises a matrix (M) comprising a propylene polymer (PP1). It is preferred that the matrix (M) comprises at least 80.0 wt.-%, more preferably at least 90.0 wt.-%, still more preferably at least 95.0 wt.-%, like 99.0 wt.-% of the propylene polymer (PP1), based on the overall weight of the matrix (M). Thus, it is preferred that the matrix (M) does not comprise (a) further polymer (s) different to the propylene polymer (PP1) in an amount exceeding 20.0 wt.-%, preferably in an amount exceeding 10.0 wt.-%, more preferably in an amount exceeding 5.0 wt.-%, like 1.0 wt.-%, based on the weight of the matrix (M). It is especially preferred that the matrix (M) consists of the propylene polymer (PP1).

Accordingly, it is preferred that the polypropylene composition (C) comprises 45.0 to 80.0 wt.-%, more preferably 47.0 to 65.0 wt.-%, still more preferably 50.0 to 55.0 wt.-% of the propylene polymer (PP1), 15.0 to 40.0 wt.-%, more preferably 20.0 to 35.0 wt.-%, still more preferably 25.0 to 30.0 wt.-% of the elastomeric fraction (E) and 10.0 to 30.0 wt.-%, more preferably 15.0 to 25.0 wt.-%, still more preferably 17.0 to 22.0 wt.-% of the inorganic filler (F), based on the overall weight of the polypropylene composition (C).

The elastomeric fraction (E) comprises a first elastomeric ethylene copolymer (E1) and a second elastomeric copolymer (E2). Preferably, the elastomeric fraction (E) comprises the first elastomeric ethylene copolymer (E1) and the second elastomeric ethylene copolymer (E2) in a weight ratio of 2:1 to 10:1, more preferably 3:1 to 8:1, still more preferably 5:1 to 7:1. It is especially preferred that the elastomeric fraction (E) comprises the first elastomeric ethylene copolymer (E1) and the second elastomeric ethylene copolymer (E2) in a weight ratio of 6:1.

Further, it is preferred that the elastomeric fraction (E) comprises at least 80.0 wt.-%, more preferably at least 90.0 wt.-%, still more preferably at least 95.0 wt.-%, like 99.0 wt.-% of the combined first elastomeric ethylene copolymer (E1) and second elastomeric ethylene copolymer (E2), based on the weight of the elastomeric fraction (E). Accordingly, it is preferred that the elastomeric fraction (E) does not comprise (a) further polymer (s) different to the first elastomeric ethylene copolymer (E1) and second elastomeric ethylene copolymer (E2) in an amount exceeding 20.0 wt.-%, preferably in an amount exceeding 10.0 wt.-%, more preferably in an amount exceeding 5.0 wt.-%, like 1.0 wt.-%, based on the weight of the elastomeric fraction (E). It is especially preferred that the elastomeric fraction (E) consists of the first elastomeric ethylene copolymer (E1) and second elastomeric ethylene copolymer (E2).

Accordingly, it is preferred that the polypropylene composition (C) comprises 45.0 to 80.0 wt.-%, more preferably 47.0 to 65.0 wt.-%, still more preferably 50.0 to 55.0 wt.-% of the propylene polymer (PP1), 10.0 to 40.0 wt.-%, more preferably 16.0 to 32.0 wt.-%, still more preferably 20.0 to 25.0 wt.-% of the first elastomeric ethylene copolymer (E1), 0.5 to 10.0 wt.-%, more preferably 1.0 to 8.0 wt.-%, still more preferably 2.0 to 5.0 wt.-% of the second elastomeric ethylene copolymer (E2), and 10.0 to 30.0 wt.-%, more preferably 15.0 to 25.0 wt.-%, still more preferably 17.0 to 22.0 wt.-% of the inorganic filler (F), based on the overall weight of the polypropylene composition (C).

The polypropylene composition (C) of the present invention may include additives (AD). Accordingly, it is preferred that the polypropylene composition (C) comprises, more preferably consists of, 45.0 to 80.0 wt.-%, more preferably 47.0 to 65.0 wt.-%, still more preferably 50.0 to 55.0 wt.-% of the propylene polymer (PP1), 10.0 to 40.0 wt.-%, more preferably 16.0 to 32.0 wt.-%, still more preferably 20.0 to 25.0 wt.-% of the first elastomeric ethylene copolymer (E1), 0.5 to 10.0 wt.-%, more preferably 1.0 to 8.0 wt.-%, still more preferably 2.0 to 5.0 wt.-% of the second elastomeric ethylene copolymer (E2), 10.0 to 30.0 wt.-%, more preferably 15.0 to 25.0 wt.-%, still more preferably 17.0 to 22.0 wt.-% of the inorganic filler (F), and 0.0 to 5.0 wt.-%, more preferably 0.1 to 3.0 wt.-%, still more preferably 0.5 to 1.5 wt.-% of additives (AD), based on the overall weight of the polypropylene composition (C). The additives (AD) are described in more detail below.

Preferably the polypropylene composition (C) of the invention does not comprise (a) further polymer(s) different to the propylene polymer (PP1), the first elastomeric ethylene copolymer (E1) and the second elastomeric ethylene copolymer (E2) in an amount exceeding 5.0 wt.-%, preferably in an amount exceeding 3.0 wt.-%, more preferably in an amount exceeding 2.5 wt.-%, based on the overall weight of the polypropylene composition (C).

It is preferred that the polypropylene composition (C) has a moderate melt flow rate. Thus, it is preferred that the melt flow rate $MFR_2$ (230° C.) determined according to ISO 1133 of the polypropylene composition (C) is at least 10.0 g/10 min, more preferably in the range of 15.0 to 40.0 g/10 min, still more preferably in the range of 20.0 to 35.0 g/10 min, like in the range of 25.0 to 32.0 g/10 min.

Further, it is preferred that the polypropylene composition (C) has a Charpy notched impact strength determined according to ISO 179/1eA at −30° C. of at least 3.0 kJ/m$^2$, more preferably at least 3.1 kJ/m$^2$, still more preferably 3.2 kg/m$^2$.

Preferably, the polypropylene composition (C) is obtained by melt blending the propylene polymer (PP1), the first elastomeric ethylene copolymer (E1), the second elastomeric ethylene copolymer (E2) and the inorganic filler (F). Melt blending of propylene polymer (PP1) with the first elastomeric ethylene copolymer (E1) and the second elastomeric ethylene copolymer (E2) results in a heterophasic system wherein the first elastomeric ethylene copolymer (E1) and the second elastomeric ethylene copolymer (E2) are dispersed within the propylene polymer (PP1), i.e. a heterophasic system wherein the propylene polymer (PP1) forms the matrix and the first elastomeric ethylene copolymer (E1) and the second elastomeric ethylene copolymer (E2) from the dispersed phase.

In the following, the propylene polymer (PP1), the first elastomeric ethylene copolymer (E1), the second elastomeric ethylene copolymer (E2) and the inorganic filler (F) are described in more detail.

The Propylene Polymer (PP1)

The propylene polymer (PP1) can be a propylene copolymer or a propylene homopolymer, the latter being preferred.

In case the propylene polymer (PP1) is a propylene copolymer, the first propylene polymer (PP1) comprises monomers copolymerizable with propylene, for example comonomers such as ethylene and/or $C_4$ to $C_6$ α-olefins, in particular ethylene and/or $C_4$ to $C_6$ α-olefins, e.g. 1-butene and/or 1-hexene. Preferably the propylene polymer (PP1) according to this invention comprises, especially consists of, monomers copolymerizable with propylene from the group consisting of ethylene, 1-butene and 1-hexene. More specifically the propylene polymer (PP1) of this invention comprises—apart from propylene—units derivable from ethylene and/or 1-butene. In a preferred embodiment the propylene polymer (PP1) comprises units derivable from ethylene and propylene only.

The comonomer content of the propylene polymer (PP1) is in the range of 0.0 to 5.0 mol-%, yet more preferably in the range of 0.0 to 3.0 mol-%, still more preferably in the range of 0.0 to 1.0 mol-%.

It is especially preferred that the propylene polymer (PP1) is a propylene homopolymer (H-PP1).

According to the present invention the expression "propylene homopolymer" relates to a polypropylene that consists substantially, i.e. of at least 99.0 wt.-%, more preferably of at least 99.5 wt.-%, still more preferably of at least 99.8 wt.-%, like of at least 99.9 wt.-%, of propylene units. In another embodiment only propylene units are detectable, i.e. only propylene has been polymerized.

It is preferred that the propylene polymer (PP1) is featured by a moderate melt flow rate. Accordingly, it is preferred that the propylene polymer (PP1) has a melt flow rate $MFR_2$ (230° C., 2.16 kg) determined according to ISO 1133 the range of 20.0 to 200.0 g/10 min, more preferably in a range of 40.0 to 100.0 g/10 min, still more preferably in a range of 60.0 to 80.0 g/10 min, like in a range of 70.0 to 78.0 g/10 min.

Preferably the propylene polymer (PP1) is isotactic. Accordingly, it is preferred that the propylene polymer (PP1) has a rather high pentad concentration (mmmm %) i.e. more than 94.1%, more preferably more than 94.4%, like more than 94.4 to 98.5%, still more preferably at least 94.7%, like in the range of 94.7 to 97.5%.

A further characteristic of the f propylene polymer (PP1) is the low amount of misinsertions of propylene within the polymer chain, which indicates that the propylene polymer (PP1) is produced in the presence of a Ziegler-Natta catalyst. Accordingly, the first propylene polymer (PP1) is preferably featured by low amount of 2,1 erythro regio-defects, i.e. of equal or below 0.4 mol.-%, more preferably of equal or below than 0.2 mol.-%, like of not more than 0.1 mol.-%, determined by $^{13}$C-NMR spectroscopy. In an especially preferred embodiment no 2,1 erythro regio-defects are detectable.

It is preferred that the propylene polymer (PP1) is featured by rather low cold xylene soluble (XCS) content, i.e. by a xylene cold soluble (XCS) below 3.1 wt.-% Accordingly, the propylene polymer (PP1) has preferably a xylene cold soluble content (XCS) in the range of 1.0 to 3.0 wt.-%, more preferably in the range of 2.0 to 2.8 wt.-%, still more preferably in the range of 2.2 to 2.6 wt.-%.

Further, the propylene polymer (PP1) is preferably a crystalline propylene homopolymer. The term "crystalline" indicates that the propylene polymer (PP1) has a rather high melting temperature. Accordingly throughout the invention the propylene polymer (PP1) is regarded as crystalline unless otherwise indicated. Therefore, the propylene polymer (PP1) preferably has a melting temperature Tm measured by differential scanning calorimetry (DSC) of at least 160° C., more preferably at least 161° C., still more preferably at least 163° C., like in the range of 163° C. to 167° C.

Further it is preferred that the propylene polymer (PP1) has a crystallization temperature Tc measured by differential scanning calorimetry (DSC) of equal or more than 110° C., more preferably in the range of 110 to 128° C., more preferably in the range of 114 to 120° C.

The propylene polymer (PP1) is preferably featured by high stiffness. Accordingly the propylene polymer (PP1) preferably has a rather high flexural modulus. Accordingly it is preferred that the propylene polymer (PP1) has a flexural modulus according to ISO 178 of at least 800 MPa, more preferably in the range of 800 to 2,000 MPa, still more preferably in the range of 1,000 to 1,600 MPa.

Preferably, the propylene polymer (PP1) is obtained by polymerizing propylene in the presence of a Ziegler-Natta catalyst as defined below. More preferably, the propylene polymer (PP1) according to this invention is obtained by a process as defined in detail below by using the Ziegler-Natta catalyst.

The propylene polymer (PP1) of the present invention may comprise further components. However, it is preferred that the inventive propylene polymer (PP1) comprises as polymer components only the propylene polymer (PP1) as defined in the instant invention. Accordingly, the amount of propylene polymer (PP1) may not result in 100.0 wt.-% based on the total propylene polymer (PP1). Thus, the remaining part up to 100.0 wt.-% may be accomplished by further additives known in the art. However, this remaining part shall be not more than 5.0 wt.-%, like not more than 3.0 wt.-% within the total propylene polymer (PP1). For instance, the inventive propylene polymer (PP1) may comprise additionally small amounts of additives selected from the group consisting of antioxidants, stabilizers, fillers, colorants, nucleating agents and antistatic agents. In general, they are incorporated during granulation of the pulverulent product obtained in the polymerization. Accordingly, the propylene polymer (PP1) constitutes at least to 95.0 wt.-%, more preferably at least 97.0 wt.-% to the total propylene polymer (PP1).

In case the propylene polymer (PP1) comprises an α-nucleating agent, it is preferred that it is free of β-nucleating agents. The α-nucleating agent is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3: 2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3: 2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis (4, 6,-di-tert-butylphenyl) phosphate or aluminum-hydroxy-bis[2,2'-methylene-bis(4,6-di-t-butylphenyl)phosphate], and (iv) vinylcycloalkane polymer and vinylalkane polymer (as discussed in more detail below), and (v) mixtures thereof.

Such additives are generally commercially available and are described, for example, in "Plastic Additives Handbook", pages 871 to 873, 5th edition, 2001 of Hans Zweifel.

Preferably the propylene polymer (PP1), contains up to 5.0 wt.-% of the α-nucleating agent. In a preferred embodiment, the propylene homopolymer contains not more than 500 ppm, more preferably of 0.025 to 200 ppm, more preferably of 0.1 to 200 ppm, still more preferably 0.3 to 200 ppm, most preferably 0.3 to 100 ppm of a α-nucleating agent, in particular selected from the group consisting of dibenzylidenesorbitol (e.g. 1,3: 2,4 dibenzylidene sorbitol), dibenzylidenesorbitol derivative, preferably dimethyldibenzylidenesorbitol (e.g. 1,3: 2,4 di(methylbenzylidene) sorbitol), or substituted nonitol-derivatives, such as 1,2,3,-trideoxy-4,6:5,7-bis-O-[(4-propylphenyl)methylene]-nonitol, sodium 2,2'-methylenebis (4, 6,-di-tert-butylphenyl) phosphate, vinylcycloalkane polymer, vinylalkane polymer, and mixtures thereof.

However, it is preferred that the propylene polymer (PP1) does not comprise a nucleating agent.

The propylene polymer (PP1) according to this invention is preferably produced in the presence of
(a) a Ziegler-Natta catalyst comprising compounds (TC) of a transition metal of Group 4 to 6 of IUPAC, a Group 2 metal compound (MC) and an internal donor (ID);
(b) optionally a co-catalyst (Co), and
(c) optionally an external donor (ED).

Preferably, the propylene polymer (PP1) is produced in a polymerization process as further described below comprising at least one reactor, like two reactors (R1) and (R2). Preferably, the propylene polymer (PP1) is produced in one polymerization reactor (R1).

The process for the preparation of the propylene homopolymer as well as the Ziegler-Natta catalyst are further described in detail below.

The polymerization reactor (R1) can be a gas phase reactor (GPR) or a slurry reactor (SR). A gas phase reactor (GPR) according to this invention is preferably a fluidized bed reactor, a fast fluidized bed reactor or a settled bed reactor or any combination thereof.

Preferably, the polymerization reactor (R1) is a slurry reactor (SR) which can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second polymerization reactor (R2) and any subsequent reactor, if present, are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 m/sec. Thus it is appreciated that the gas phase reactor is a fluidized bed type reactor preferably with a mechanical stirrer.

If any subsequent reactor is present, the propylene homopolymer of the first polymerization reactor (R1), is preferably directly fed into the second polymerization reactor (R2), i.e. into the (first) gas phase reactor (GPR1), without a flash step between the stages. This kind of direct feed is described in EP 887379 A, EP 887380 A, EP 887381 A and EP 991684 A. By "direct feed" is meant a process wherein the content of the first polymerization reactor (R1), i.e. of the loop reactor (LR), is led directly to the next stage gas phase reactor.

Alternatively, the propylene homopolymer of the first polymerization reactor (R1), more preferably polymer slurry of the loop reactor (LR), may be also directed into a flash step or through a further concentration step before fed into the second polymerization reactor (R2), i.e. into the gas phase reactor (GPR). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

However, it is preferred that the propylene polymer (PP1) is prepared in one reactor, i.e. the polymerization reactor (R1) being a loop reactor (LR).

If needed prior to the slurry reactor (SR), i.e. the loop reactor (LR), a pre-polymerization reactor is placed.

The Ziegler-Natta catalyst is fed into the polymerization reactor (R1). If the process covers also a pre-polymerization step it is preferred that all of the Ziegler-Natta catalyst is fed in the pre-polymerization reactor. Subsequently the pre-polymerization product containing the Ziegler-Natta catalyst is transferred into the polymerization reactor (R1).

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

Especially good results are achieved in case the temperature in the reactors is carefully chosen.

Accordingly it is preferred that the operating temperature in the polymerization reactor (R1) is in the range of 62 to 85° C., more preferably in the range of 65 to 82° C., still more preferably in the range of 67 to 80° C.

Typically the pressure in the polymerization reactor (R1), preferably in the loop reactor (LR), is in the range from 20 to 80 bar, preferably 30 to 70 bar, like 35 to 65 bar.

Preferably hydrogen is added in each polymerization reactor in order to control the molecular weight, i.e. the melt flow rate $MFR_2$.

Preferably the average residence time is rather long in the polymerization reactors (R1). In general, the average residence time ($\tau$) is defined as the ratio of the reaction volume ($V_R$) to the volumetric outflow rate from the reactor ($Q_o$) (i.e. $V_R/Q_o$), i.e $\tau = V_R/Q_o$ [tau=$V_R/Q_o$]. In case of a loop reactor the reaction volume ($V_R$) equals to the reactor volume.

Accordingly the average residence time ($\tau$) in the polymerization reactor (R1) is preferably at least 15 min, more preferably in the range of 15 to 80 min, still more preferably in the range of 20 to 60 min, like in the range of 24 to 50 min.

As mentioned above the preparation of the propylene homopolymer can comprise in addition to the (main) polymerization of the propylene homopolymer in the polymerization reactor (R1) prior thereto a pre-polymerization in a pre-polymerization reactor (PR) upstream to the polymerization reactor (R1).

In the pre-polymerization reactor (PR) a polypropylene (Pre-PP) is produced. The pre-polymerization is conducted in the presence of the Ziegler-Natta catalyst. According to this embodiment the Ziegler-Natta catalyst, the co-catalyst (Co), and the external donor (ED) are all introduced to the pre-polymerization step. However, this shall not exclude the option that at a later stage for instance further co-catalyst (Co) and/or external donor (ED) is added in the polymerization process, for instance in the first reactor (R1). In one embodiment the Ziegler-Natta catalyst, the co-catalyst (Co) and the external donor (ED) are only added in the pre-polymerization reactor (PR), if a pre-polymerization is applied.

The pre-polymerization reaction is typically conducted at a temperature of 0 to 60° C., preferably from 15 to 50° C., and more preferably from 20 to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed is employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, preferably a mixture (MI) of the Ziegler-Natta catalyst and the polypropylene (Pre-PP) produced in the pre-polymerization reactor (PR) is obtained. Preferably the Ziegler-Natta catalyst is (finely) dispersed in the polypropylene (Pre-PP). In other words, the Ziegler-Natta catalyst particles introduced in the pre-polymerization reactor (PR) split into smaller fragments which are evenly distributed within the growing polypropylene (Pre-PP). The sizes of the introduced Ziegler-Natta catalyst particles as well as of the obtained fragments are not of essential relevance for the instant invention and within the skilled knowledge.

As mentioned above, if a pre-polymerization is used, subsequent to said pre-polymerization, the mixture (MI) of the Ziegler-Natta catalyst and the polypropylene (Pre-PP) produced in the pre-polymerization reactor (PR) is transferred to the first reactor (R1). Typically the total amount of the polypropylene (Pre-PP) in the final propylene polymer (PP1) is rather low and typically not more than 5.0 wt.-%, more preferably not more than 4.0 wt.-%, still more preferably in the range of 0.5 to 4.0 wt.-%, like in the range 1.0 of to 3.0 wt.-%.

In case that pre-polymerization is not used, propylene and the other ingredients such as the Ziegler-Natta catalyst are directly introduced into the first polymerization reactor (R1).

Accordingly, the propylene homopolymer is preferably produced in a process comprising the following steps under the conditions set out above (a) in the first polymerization reactor (R1), i.e. in a loop reactor (LR), propylene is polymerized obtaining the propylene polymer (PP1).

A pre-polymerization as described above can be accomplished prior to step (a).

In the process described above a Ziegler-Natta catalyst (ZN-C1) for the preparation of the propylene polymer (PP1) is applied. This Ziegler-Natta catalyst (ZN-C1) can be any stereospecific Ziegler-Natta catalyst (ZN-C1) for propylene polymerization, which preferably is capable of catalyzing the polymerization and copolymerization of propylene and optional comonomers at a pressure of 500 to 10000 kPa, in particular 2500 to 8000 kPa, and at a temperature of 40 to 110° C., in particular of 60 to 110° C.

Preferably, the Ziegler-Natta catalyst (ZN-C1) comprises a high-yield Ziegler-Natta type catalyst including an internal donor component, which can be used at high polymerization temperatures of 80° C. or more. Such high-yield Ziegler-Natta catalyst (ZN-C1) can comprise a succinate, a diether, a phthalate etc., or mixtures therefrom as internal donor (ID) and are for example commercially available from Lyondell-Basell under the Avant ZN trade name. Examples of the Avant ZN series are Avant ZN 126 and Avant ZN 168. Avant ZN 126 is a Ziegler-Natta catalyst with 3.5 wt % titanium and a diether compound as internal electron donor, which is commercially available from LyondellBasell. Avant ZN 168 is a Ziegler-Natta catalyst with 2.6 wt % titanium and a succinate compound as internal electron donor, which is commercially available from LyondellBaselll. A further example of the Avant ZN series is the catalyst ZN180M of LyondellBasell.

Additional suitable catalysts are described for example in WO 2012/007430, EP2610271, EP261027 and EP2610272.

The Ziegler-Natta catalyst (ZN-C1) is preferably used in association with an alkyl aluminum cocatalyst and optionally external donors.

As further component in the instant polymerization process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula

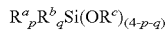

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$, or of general formula

wherein R3 and R4 can be the same or different a represent a hydrocarbon group having 1 to 12 carbon atoms.

R3 and R4 are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that R3 and R4 are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^3$ and $R^4$ are the same, yet more preferably both $R^3$ and $R^4$ are an ethyl group.

Especially preferred external donors (ED) are the dicyclopentyl dimethoxy silane donor (D donor) or the cyclohexylmethyl dimethoxy silane donor (C-Donor).

In addition to the Ziegler-Natta catalyst (ZN-C1) and the optional external donor (ED) a cocatalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkyl-aluminum, like triethylaluminum (TEAL), dialkyl aluminum chloride or alkyl aluminum dichloride or mixtures thereof. In one specific embodiment the co-catalyst (Co) is triethylaluminum (TEAL).

Preferably the ratio between the co-catalyst (Co) and the external donor (ED) [Co/ED] and/or mthe ratio between the co-catalyst (Co) and the transition metal (TM) [Co/TM] should be carefully chosen.

Accordingly,
(a) the mol-ratio of co-catalyst (Co) to external donor (ED) [Co/ED] must be in the range of 5 to 45, preferably is in the range of 5 to 35, more preferably is in the range of 5 to 25;
and optionally
(b) the mol-ratio of co-catalyst (Co) to titanium compound (TC) [Co/TC] must be in the range of above 80 to 500, preferably is in the range of 90 to 350, still more preferably is in the range of 100 to 300.

The first elastomeric ethylene copolymer (E1)

As outlined above, the elastomeric fraction (E) comprises a first elastomeric ethylene copolymer (E1) and a second elastomeric ethylene copolymer (E2).

The first elastomeric ethylene copolymer (E1) is a copolymer of ethylene and at least one comonomer copolymerizable with ethylene, for example comonomers such as $C_3$ to $C_{20}$ α-olefins, in particular $C_4$ to $C_8$ α-olefins, e.g. 1-butene and/or 1-octene. Preferably the first elastomeric ethylene copolymer (E1) according to this invention comprises, especially consists of, monomers copolymerizable with ethylene from the group consisting of propylene, 1-butene, 1-hexene and 1-octene. More specifically the first elastomeric ethylene copolymer (E1) of this invention comprises—apart from ethylene—units derivable from 1-butene or 1-octene. In a preferred embodiment the first elastomeric ethylene copolymer (E1) comprises units derivable from ethylene and 1-octene only.

It is especially preferred that the first elastomeric ethylene copolymer (E1) does not contain monomer units derivable from styrene or derivatives thereof. Accordingly, the first elastomeric ethylene copolymer (E1) is preferably a copolymer that consists substantially, i.e. of at least 99.0 wt.-%, more preferably of at least 99.5 wt.-%, still more preferably of at least 99.8 wt.-%, like of at least 99.9 wt.-%, of ethylene and 1-octene units. In another embodiment only ethylene and 1-octene units are detectable, i.e. only ethylene and 1-octene have been polymerized.

The comonomer content, preferably 1-octene content, of the first elastomeric ethylene copolymer (E1) is in the range of 5.5 to 30.0 mol-%, yet more preferably in the range of 7.5 to 20.0 mol-%, still more preferably in the range of 10.5 to 14.0 mol-%.

In a preferred embodiment, the first elastomeric ethylene copolymer (E1) has a density below 0.885 g/cm$^3$. More preferably, the density of the first elastomeric ethylene copolymer (E1) is equal or below 0.870 g/cm$^3$, still more preferably in the range of 0.845 to 0.868 g/cm$^3$, like in the range of 0.855 to 0.865 g/cm$^3$.

Preferably, the first elastomeric ethylene copolymer (E1) has a melt flow rate MFR$_2$ (190° C., 2.16 kg) determined according to ISO 1133 below 100 g/10 min, more preferably from 0.1 to 30 g/10 min, still more preferably from 0.1 to 15 g/10 min, like a range from 0.1 to 5.0 g/10 min.

In one preferred embodiment the first elastomeric ethylene copolymer (E1) is prepared with at least one metallocene catalyst. The first elastomeric ethylene copolymer (E1) may also be prepared with more than one metallocene catalyst or may be a blend of multiple elastomers prepared with different metallocene catalysts. In some embodiments, the first elastomeric ethylene copolymer (E1) is a substantially linear ethylene polymer (SLEP). SLEPs and other metallocene catalysed first elastomeric ethylene copolymer (E1) are known in the art, for example, U.S. Pat. No. 5,272,236. These resins are also commercially available, for example, as Queo™ plastomers available from Borealis, ENGAGE™ and AFFINITY™ plastomer resins available from Dow Chemical Co., EXACT™ polymers from Exxon or TAFMER™ polymers from Mitsui, Lucene from LG Chemicals and Fortify from Sabic.

The second elastomeric ethylene copolymer (E2)

The polypropylene composition according to the present invention further comprises a second elastomeric ethylene copolymer (E2).

Like the first elastomeric ethylene copolymer (E1), the second elastomeric ethylene copolymer (E2) is a copolymer of ethylene and at least one comonomer copolymerizable with ethylene, for example comonomers such as $C_3$ to $C_{20}$ α-olefins, in particular propylene and/or 1-butene. Preferably the second elastomeric ethylene copolymer (E2) according to this invention comprises, especially consists of, monomers copolymerizable with ethylene from the group consisting of propylene, 1-butene, 1-hexene and 1-octene.

More specifically the second elastomeric ethylene copolymer (E2) of this invention comprises—apart from ethylene—units derivable from propylene or 1-butene. In a preferred embodiment the second elastomeric ethylene copolymer (E2) comprises units derivable from ethylene and propylene only.

It is especially preferred that the second elastomeric ethylene copolymer (E2) does not contain monomer units derivable from styrene or derivatives thereof. Accordingly, the second elastomeric ethylene copolymer (E2) is preferably a copolymer that consists substantially, i.e. of at least 99.0 wt.-%, more preferably of at least 99.5 wt.-%, still more preferably of at least 99.8 wt.-%, like of at least 99.9 wt.-%, of ethylene and propylene units. In another embodiment only ethylene and propylene units are detectable, i.e. only ethylene and propylene have been polymerized.

In particular, it is preferred that the second elastomeric ethylene copolymer (E2) is a copolymer of ethylene and propylene featured by a rather high propylene content.

Accordingly, it is preferred that the second elastomeric ethylene copolymer (E2) has a comonomer content, preferably propylene content, of at least 60.0 mol-%, more preferably at least 70.0 mol-%, still more preferably at least 77.0 mol-%. In particular, it is preferred that the second elastomeric ethylene copolymer (E2) has a comonomer content, preferably propylene content, in the range of 60.0 to 95.0 mol-%, more preferably in the range of 70.0 to 85.0 mol-%, still more preferably in the range of 75.0 to 80.0 mol-%.

Additionally or alternatively to the previous paragraph, it is preferred that the second elastomeric ethylene copolymer (E2) has an ethylene content equal or below 30.0 mol-%, more preferably in the range of 10.0 to 28.0 mol-%, still more preferably in the range of 15.0 to 25.0 mol-%, like in the range of 18.0 to 23.0 mol-%.

In a preferred embodiment, the second elastomeric ethylene copolymer (E2) has a density below 0.870 g/cm$^3$. More preferably, the density of the second elastomeric ethylene copolymer (E2) is equal or below 0.865 g/cm$^3$, still more preferably in the range of 0.845 to 0.865 g/cm$^3$, like in the range of 0.855 to 0.864 g/cm$^3$.

Preferably, the second elastomeric ethylene copolymer (E2) has a melt flow rate MFR$_2$ (190° C., 2.16 kg) determined according to ISO 1133 in the range of 0.5 to 15.0 g/10 min, more preferably from 1.0 to 12.0 g/10 min, still more preferably from 1.2 to 10.0 g/10 min.

Preferably, the second elastomeric ethylene copolymer (E2) is a propylene rich elastomeric copolymer of propylene and ethylene known in the art. Such propylene rich resins are, for example, commercially available as Vistamaxx™ propylene-based elastomers from Exxon or Versify™ plastomers and elastomers from Dow Chemical Co.

The Inorganic Filler (F)

A further requirement of the composition according to this invention is the presence of an inorganic filler (F).

Preferably the inorganic filler (F) is a mineral filler. It is appreciated that the inorganic filler (F) is a phyllosilicate, mica or wollastonite. Even more preferred the inorganic filler (F) is selected from the group consisting of mica, wollastonite, kaolinite, smectite, montmorillonite and talc. The most preferred inorganic fillers (F) are talc and/or wollastonite.

It is appreciated that the filler (F) has median particle size (D$_{50}$) in the range of 0.8 to 20.0 μm and a top cut particle size (D$_{95}$) in the range of 3.0 to 20.0 μm, preferably a median particle size (D$_{50}$) in the range of 2.0 to 8.0 μm and top cut particle size (D$_{95}$) in the range of 5.0 to 17.0 μm, more preferably a median particle size (D$_{50}$) in the range of 3.0 to 6.0 μm and top cut particle size (D$_{95}$) of 6.0 to 15.0 μm.

According to this invention the filler (F) does not belong to the class of alpha nucleating agents and additives (AD).

The the filler (F) is state of the art and a commercially available product.

The Additives (AD)

In addition the propylene polymer (PP1), the first elastomeric ethylene copolymer (E1), the second elastomeric ethylene copolymer (E2) and the inorganic filler (F), the polypropylene composition (C) of the invention may include additives (AD). Typical additives are acid scavengers, antioxidants, colorants, light stabilisers, plasticizers, slip agents, anti-scratch agents, dispersing agents, processing aids, lubricants, pigments, and the like. As indicated above the inorganic filler (F) is not regarded as an additive (AD).

Such additives are commercially available and for example described in "Plastic Additives Handbook", 6$^{th}$ edition 2009 of Hans Zweifel (pages 1141 to 1190).

Furthermore, the term "additives (AD)" according to the present invention also includes carrier materials, in particular polymeric carrier materials.

The Polymeric Carrier Material

Preferably the polypropylene composition (C) of the invention does not comprise (a) further polymer (s) different to the propylene polymer (PP1), the first elastomeric ethylene copolymer (E1) and the second elastomeric ethylene copolymer (E2), in an amount exceeding 15 wt.-%, preferably in an amount exceeding 10 wt.-%, more preferably in an amount exceeding 9 wt.-%, based on the weight of the polypropylene composition (C). Any polymer being a carrier material for additives (AD) is not calculated to the amount of polymeric compounds as indicated in the present invention, but to the amount of the respective additive.

The polymeric carrier material of the additives (AD) is a carrier polymer to ensure a uniform distribution in the polypropylene composition (C) of the invention. The polymeric carrier material is not limited to a particular polymer. The polymeric carrier material may be ethylene homopolymer, ethylene copolymer obtained from ethylene and α-olefin comonomer such as C$_3$ to C$_8$ α-olefin comonomer, propylene homopolymer and/or propylene copolymer obtained from propylene and α-olefin comonomer such as ethylene and/or C$_4$ to C$_8$ α-olefin comonomer. It is preferred that the polymeric carrier material does not contain monomeric units derivable from styrene or derivatives thereof The Article The polypropylene composition (C) of the present invention is preferably used for the production of articles, more preferably of molded articles, yet more preferably of injection molded articles. Even more preferred is the use for the production of parts of washing machines or dishwashers as well as automotive articles, especially of car interiors and exteriors, like bumpers, side trims, step assists, body panels, spoilers, dashboards, interior trims and the like.

The current invention also provides articles, more preferably molded articles, like injection molded articles, comprising, preferably comprising at least 60 wt.-%, more preferably at least 80 wt.-%, yet more preferably at least 95 wt.-%, like consisting of, the inventive polypropylene composition (C). Accordingly the present invention is especially directed to parts of washing machines or dishwashers as well as to automotive articles, especially to car interiors and exteriors, like bumpers, side trims, step assists, body panels, spoilers, dashboards, interior trims and the like, comprising, preferably comprising at least 60 wt.-%, more preferably at least 80 wt.-%, yet more preferably at least 95 wt.-%, like consisting of, the inventive polypropylene composition (C).

The present invention will now be described in further detail by the examples provided below.

EXAMPLES

1. Definitions/Measuring Methods

The following definitions of terms and determination methods apply for the above general description of the invention as well as to the below examples unless otherwise defined.

Determination of Pentad Isotacticity in Propylene Polymer (PP1) being a Polypropylene Homopolymer by NMR Spectroscopy Quantitative nuclear-magnetic resonance (NMR) spectroscopy was used to quantify the pentad isotacticity of the polypropylene homopolymers. Quantitative $^{13}C\{^1H\}$ NMR spectra recorded in the solution-state using a Bruker Avance III 400 NMR spectrometer operating at 400.15 and 100.62 MHz for $^1H$ and $^{13}C$ respectively. All spectra were recorded using a $^{13}C$ optimised 10 mm selective excitation probehead at 125° C. using nitrogen gas for all pneumatics. Approximately 200 mg of material was dissolved in 1,2-tetrachloroethane-$d_2$ (TCE-$d_2$). This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 6144 (6 k) transients were acquired per spectra using a 3 s recycle delay. Quantitative $^{13}C\{^1H\}$ NMR spectra were processed, integrated and relevant quantitative properties determined from the integrals using proprietary computer programs. All chemical shifts are internally referenced to the methyl signal of the isotactic pentad mmmm at 21.85 ppm.

Characteristic signals corresponding to regio irregular propene insertion were not observed (Resconi, L., Cavallo, L., Fait, A., Piemontesi, F., Chem. Rev. 2000, 100, 1253).

The tacticity distribution was quantified through integration of the methyl region between 23.6 and 19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251). The pentad isotacticity was determined through direct integration of the methyl region and reported as either the mole fraction or percentage of isotactic pentad mmmm with respect to all steric pentads i.e. [mmmm]=mmmm/sum of all steric pentads. When appropriate integrals were corrected for the presence of sites not directly associated with steric pentads.

Quantification of Comonomer Content in Propylene Polymer (PP1) being a Propylene Copolymer and Second Elastomeric Ethylene Copolymer (E2) by NMR Spectroscopy Quantitative $^{13}C\{^1H\}$ NMR spectra were recorded in the solution-state using a Bruker Avance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium (III) acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225, Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}C\{^1H\}$ NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present.

Characteristic signals corresponding to the incorporation of ethylene were observed (Cheng, H. N., Macromolecules 17 (1984), 1950) and the comonomer fraction calculated as the fraction of ethylene in the polymer with respect to all monomer in the polymer: fE=(E/(P+E). The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents. For systems with very low ethylene content where only isolated ethylene in PPEPP sequences were observed the method of Wang et. al. was modified reducing the influence of integration of sites that are no longer present. This approach reduced the overestimation of ethylene content for such systems and was achieved by reduction of the number of sites used to determine the absolute ethylene content to E=0.5(Sbb+Sbg+Sbd+0.5(Sab+Sag)) Through the use of this set of sites the corresponding integral equation becomes E=0.5($I_H$+$I_G$+0.5($I_C$+$I_D$)) using the same notation used in the article of Wang et. al. (Wang, W-J., Zhu, S., Macromolecules 33 (2000), 1157). Equations used for absolute propylene content were not modified. The mole percent comonomer incorporation was calculated from the mole fraction: E [mol %]=100*fE. The mole percent propylene incorporation was calculated from the formula: P [mol %]=100−E[mol %].

Quantification of Comonomer Content in First Elastomeric Ethylene Copolymer (E1) by NMR Spectroscopy Quantitative nuclear-magnetic resonance (NMR) spectroscopy was used to quantify the comonomer content of the polymers.

Quantitative $^{13}C\{^1H\}$ NMR spectra recorded in the molten-state using a Bruker Avance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification (Klimke, K., Parkinson, M., Piel, C., Kaminsky, W., Spiess, H. W., Wilhelm, M., Macromol. Chem. Phys. 2006; 207:382.; Parkinson, M., Klimke, K., Spiess, H. W., Wilhelm, M., Macromol. Chem. Phys. 2007; 208:2128.; Castignolles, P., Graf, R., Parkinson, M., Wilhelm, M., Gaborieau, M., Polymer 50 (2009) 2373; NMR Spectroscopy of Polymers: Innovative Strategies for Complex Macromolecules, Chapter 24, 401 (2011)). Standard single-pulse excitation was employed utilising the transient NOE at short recycle delays of 3 s (Pollard, M., Klimke, K., Graf, R., Spiess, H. W., Wilhelm, M., Sperber, O., Piel, C., Kaminsky, W., Macromolecules 2004; 37:813.; Klimke, K., Parkinson, M., Piel, C., Kaminsky, W., Spiess, H. W., Wilhelm, M., Macromol. Chem. Phys. 2006; 207:382.) and the RS-HEPT decoupling scheme (Filip, X., Tripon, C., Filip, C., J. Mag. Resn. 2005, 176, 239.; Griffin, J. M., Tripon, C., Samoson, A., Filip, C., and Brown, S. P., Mag. Res. in Chem. 2007 45, S1, S198). A total of 1024 (1 k) transients were acquired per spectrum. This setup was chosen due its high sensitivity towards low comonomer contents.

Quantitative $^{13}C\{^{1}H\}$ NMR spectra were processed, integrated and quantitative properties determined using custom spectral analysis automation programs. All chemical shifts are internally referenced to the bulk methylene signal ($\delta+$) at 30.00 ppm (J. Randall, Macromol. Sci., Rev. Macromol. Chem. Phys. 1989, C29, 201.).

Poly(ethylene-co-octene)-octene Content

Characteristic signals corresponding to the incorporation of 1-octene were observed (J. Randall, Macromol. Sci., Rev. Macromol. Chem. Phys. 1989, C29, 201.; Liu, W., Rinaldi, P., McIntosh, L., Quirk, P., Macromolecules 2001, 34, 4757; Qiu, X., Redwine, D., Gobbi, G., Nuamthanom, A., Rinaldi, P., Macromolecules 2007, 40, 6879) and all comonomer contents calculated with respect to all other monomers present in the polymer.

Characteristic signals resulting from isolated 1-octene incorporation i.e. EEOEE comonomer sequences, were observed. Isolated 1-octene incorporation was quantified using the integral of the signal at 38.37 ppm. This integral is assigned to the unresolved signals corresponding to both $_*B6$ and $_*\beta B6B6$ sites of isolated (EEOEE) and isolated double non-consecutive (EEOEOEE) 1-octene sequences respectively. To compensate for the influence of the two $_*\beta B6B6$ sites the integral of the $\beta\beta B6B6$ site at 24.7 ppm is used:

$$O = I_{*B6+*\beta B6B6} - 2*I_{\beta\beta B6B6}$$

Characteristic signals resulting from consecutive 1-octene incorporation, i.e. EEOOEE comonomer sequences, were also observed. Such consecutive 1-octene incorporation was quantified using the integral of the signal at 40.57 ppm assigned to the $\alpha\alpha B6B6$ sites accounting for the number of reporting sites per comonomer:

$$OO = 2*I_{\alpha\alpha B6B6}$$

Characteristic signals resulting from isolated non-consecutive 1-octene incorporation, i.e. EEOEOEE comonomer sequences, were also observed. Such isolated non-consecutive 1-octene incorporation was quantified using the integral of the signal at 24.7 ppm assigned to the $\beta\beta B6B6$ sites accounting for the number of reporting sites per comonomer:

$$OEO = 2*I_{\beta\beta B6B6}$$

Characteristic signals resulting from isolated triple-consecutive 1-octene incorporation, i.e. EEOOOEE comonomer sequences, were also observed. Such isolated triple-consecutive 1-octene incorporation was quantified using the integral of the signal at 41.2 ppm assigned to the $\alpha\alpha\gamma B6B6B6$ sites accounting for the number of reporting sites per comonomer:

$$OOO = 3/2*I_{\alpha\alpha\gamma B6B6B6}$$

With no other signals indicative of other comonomer sequences observed the total 1-octene comonomer content was calculated based solely on the amount of isolated (EEOEE), isolated double-consecutive (EEOOEE), isolated non-consecutive (EEOEOEE) and isolated triple-consecutive (EEOOOEE) 1-octene comonomer sequences:

$$O_{total} = O + OO + OEO + OOO$$

Characteristic signals resulting from saturated end-groups were observed. Such saturated end-groups were quantified using the average integral of the two resolved signals at 22.84 and 32.23 ppm. The 22.84 ppm integral is assigned to the unresolved signals corresponding to both 2B6 and 2S sites of 1-octene and the saturated chain end respectively. The 32.23 ppm integral is assigned to the unresolved signals corresponding to both 3B6 and 3S sites of 1-octene and the saturated chain end respectively. To compensate for the influence of the 2B6 and 3B6 1-octene sites the total 1-octene content is used:

$$S = (½)*(I_{2S+2B6} + I_{3S+3B6} - 2*O_{total})$$

The ethylene comonomer content was quantified using the integral of the bulk methylene (bulk) signals at 30.00 ppm. This integral included the $\gamma$ and 4B6 sites from 1-octene as well as the $\delta^+$ sites. The total ethylene comonomer content was calculated based on the bulk integral and compensating for the observed 1-octene sequences and end-groups:

$$E_{total} = (½)*[I_{bulk} + 2*O + 1*OO + 3*OEO + 0*OOO + 3*S]$$

It should be noted that compensation of the bulk integral for the presence of isolated triple-incorporation (EEOOOEE) 1-octene sequences is not required as the number of under and over accounted ethylene units is equal.

The total mole fraction of 1-octene in the polymer was then calculated as:

$$fO = (O_{total})/(E_{total} + O_{total})$$

The total comonomer incorporation of 1-octene in mol percent was calculated from the mole fraction in the standard manner:

$$O[mol \%] = 100*fO$$

The mole percent ethyelene incorporation was calculated from the formula:

$$E[mol \%] = 100 - O[mol \%].$$

Poly(ethyelene-co-butene)-butene Content

Characteristic signals corresponding to the incorporation of 1-butene were observed (J. Randall, Macromol. Sci., Rev. Macromol. Chem. Phys. 1989, C29, 201) and all comonomer contents calculated with respect to all other monomers present in the polymer.

Characteristic signals resulting from isolated 1-butene incorporation i.e. EEBEE comonomer sequences, were observed. Isolated 1-butene incorporation was quantified using the integral of the signal at 39.9 ppm assigned to the $_*B2$ sites, accounting for the number of reporting sites per comonomer:

$$B = I_{*B2}$$

Characteristic signals resulting from double consecutive 1-butene incorporation i.e. EEBBEE comonomer sequences were observed. Consecutive double 1-butene incorporation was quantified using the integral of the signal at 39.4 ppm assigned to the ααB2B2 sites accounting for the number of reporting sites per comonomer:

$$BB = 2 * I_{\alpha\alpha B2B2}$$

Characteristic signals resulting from non consecutive 1-butene incorporation i.e. EEBEBEE comonomer sequences were also observed. Non-consecutive 1-butene incorporation was quantified using the integral of the signal at 24.7 ppm assigned to the ββB2B2 sites accounting for the number of reporting sites per comonomer:

$$BEB = 2 * I_{\beta\beta B2B2}$$

Due to the overlap of the *B2 and *βB2B2 sites of isolated (EEBEE) and non-consecutively incorporated (EEBEBEE) 1-butene respectively the total amount of isolated 1-butene incorporation is corrected based on the amount of non-consecutive 1-butene present:

$$B = I_{*B2} - 2 * I_{\beta\beta B2B2}$$

Characteristic signals resulting from triple consecutive 1-butene incorporation i.e. EEBBBEE comonomer sequences were observed. Consecutive triple 1-butene incorporation was quantified using the integral of the signal at 40.4 ppm assigned to the ααγB2B2B2 sites accounting for the number of reporting sites per comonomer:

$$BBB = 3 * I_{\alpha\alpha\gamma B2B2B2}$$

With no other signals indicative of other comonomer sequences, i.e. butene chain initiation, observed the total 1-butene comonomer content was calculated based solely on the amount of isolated (EEBEE), double consecutive (EEBBEE), non-consecutive (EEBEBEE) and triple consecutive (EEBBBEE) 1-butene comonomer sequences:

$$B_{total} = B + BB + BEB + BBB$$

Characteristic signals resulting from saturated end-groups were observed. The content of such saturated end-groups was quantified using the average of the integral of the signals at 22.84 and 32.23 ppm assigned to the 2s and 3s sites respectively:

$$S = (1/2) * (I_{2S} + I_{3S})$$

The relative content of ethylene was quantified using the integral of the bulk methylene (δ+) signals at 30.00 ppm:

$$E = (1/2) * I_{\delta+}$$

The total ethylene comonomer content was calculated based the bulk methylene signals and accounting for ethylene units present in other observed comonomer sequences or end-groups:

$$E_{total} = E + (5/2) * B + (7/2) * BB + (9/2) * BEB + (9/2) * BBB + (3/2) * S$$

The total mole fraction of 1-butene in the polymer was then calculated as:

$$fB = (B_{total})/(E_{total} + B_{total})$$

The total comonomer incorporation of 1-butene in mole percent was calculated from the mole fraction in the usual manner:

$$B[\text{mol \%}] = 100 * fB$$

The mole percent ethyelene incorporation was calculated from the formula:

$$E[\text{mol \%}] = 100 - B[\text{mol \%}].$$

MFR2 (230° C.) is measured according to ISO 1133 (230° C., 2.16 kg load).

$MFR_2$ (190° C.) is measured according to ISO 1133 (190° C., 2.16 kg load).

The xylene cold solubles (XCS, wt.-%): Content of xylene cold solubles (XCS) is determined at 25° C. according to ISO 16152; first edition; 2005-07-01. The part which remains insoluble is the xylene cold insoluble (XCI) fraction.

Density is determined according to ASTM D792 for the first elastomeric ethylene copolymer (E1) and according to ASTM D1505 for the second elastomeric ethylene copolymer (E2).

Tensile properties were determined on samples prepared from injection moulded specimen having a sample thickness of 4 mm. Tensile modulus was determined according to ISO 527-2/1 B at 1 mm/min. and 23° C. To determine stress at yield and strain at yield, a speed of 50 mm/min. was used.

Flexural Test: The flexural modulus and flexural strength were determined in 3-point-bending according to ISO 178 on injection molded specimens of 80×10×4 mm prepared in accordance with ISO 294-1:1996.

Charpy notched impact strength is determined according to ISO 179/1A at 23° C. by using injection moulded test specimens as described in EN ISO 1873-2 (80×10×4 mm).

Instrumented falling weight test: Puncture energy, maximum force and puncture deflection was determined in the instrumented falling weight test according to ISO 6603-2 using injection moulded plaques of 60×60×3 mm and a test speed of 4.4 m/s. The reported puncture energy results from an integral of the failure energy curve measured at +23° C. and −30° C.

Shrinkage: The shrinkage is determined on centre gated, injection moulded circular disks (diameter 180 mm, thickness 3 mm, having a flow angle of 355° and a cut out of 5°). Two specimens are moulded applying two different holding pressure times (10 s and 20 s respectively). The melt temperature at the gate is 260° C., and the average flow front velocity in the mould 100 mm/s. Tool temperature: 40° C., back pressure: 600 bar.

After conditioning the specimen at room temperature for 96 hours the dimensional changes radial and tangential to the flow direction are measured for both disks. The average of respective values from both disks are reported as final results.

Flow Marks

The tendency to show flow marks was examined with a method as described below. This method is described in detail in WO 2010/149529, which is incorporated herein in its entirety.

An optical measurement system, as described by Sybille Frank et al. in PPS 25 Intern. Conf. Polym. Proc. Soc 2009 or Proceedings of the SPIE, Volume 6831, pp 68130T-68130T-8 (2008) was used for characterizing the surface quality.

This method consists of two aspects:

1. Image Recording:

The basic principle of the measurement system is to illuminate the plates with a defined light source (LED) in a closed environment and to record an image with a CCD-camera system. A schematic setup is given in FIG. 1.

2. Image Analysis:

The specimen is floodlit from one side and the upwards reflected portion of the light is deflected via two mirrors to a CCD-sensor. The such created grey value image is analyzed in lines. From the recorded deviations of grey values the mean square error (MSE) is calculated allowing a quantification of surface quality, i.e. the larger the MSE value the more pronounced is the surface defect.

Generally, for one and the same material, the tendency to flow marks increases when the injection speed is increased.

For this evaluation plaques 440×148×2.8 mm with grain VW K50 and a filmgate of 1.4 mm were used and were produced with different filling times of 1.5, 3 and 6 sec respectively.

Further Conditions:
Melt temperature: 240° C.
Mould temperature 30° C.
Dynamic pressure: 10 bar hydraulic The smaller the MSE value is at a certain filling time, the smaller is the tendency for flow marks.

2. Examples

Preparation of the Propylene Polymer PP1

The catalyst used in the polymerization process for the propylene polymer (PP1) is the commercial catalyst Avant ZN180M by Lyondell Basell used along with cyclohexyl-methyl dimethoxy silane (C-Donor) as donor. The polymerization process which is used for PP1 is a loop process known as classical spheripol process.

The aluminum to donor ratio, the aluminum to titanium ratio and the polymerization conditions are indicated in Table 1.

TABLE 1

Preparation of the propylene polymer (PP1)

|  |  | PP1 |
|---|---|---|
| Prepolymerization |  |  |
| TEAL/Ti | [mol/mol] | 100 |
| TEAL/donor | [mol/mol] | 11 |
| Temperature | [° C.] | 20 |
| res.time | [h] | 0.1 |
| Donor | [-] | C |
| Loop (R1) |  |  |
| Temperature | [° C.] | 70 |
| Pressure | [bar] | 35 |
| H2 | [ppm] | 3200 |
| $MFR_2$ | [g/10 min] | 75 |
| XCS | [wt.-%] | 2.5 |

Preparation of the Polypropylene Composition (C)
Used Materials

E1 is the commercial ethylene-octene copolymer Engage 8180 by Dow having a density of 0.863 g/cm$^3$, a melt flow rate $MFR_2$ (190° C., 2.16 kg) of 0.5 g/10 min and a 1-octene content of 11.7 mol-%.

E2a is the commercial ethylene-propylene copolymer Vistamaxx 6102 by Dow having a density of 0.862 g/cm$^3$, a melt flow rate $MFR_2$ (190° C., 2.16 kg) of 1.5 g/10 min and an ethylene content of 22.2 mol-%.

E2b is the commercial ethylene-propylene copolymer Vistamaxx 6202 by Dow having a density of 0.863 g/cm$^3$, a melt flow rate $MFR_2$ (190° C., 2.16 kg) of 9.1 g/10 min and an ethylene content of 20.9 mol-%.

E2c is the commercial ethylene-butene-styrene copolymer Kraton G1657 by Kraton having a melt flow rate MFR (230° C., 2.16 kg) of 10.0 g/10 min and a styrene content of 13.0 mol.-%.

Talc is the commercial Talc Jetfine 3CA by Imerys having a d50 (Sedigraph 5100) of 1.0 μm and d95 (Laser Mastersizer) of 3.9 μm.

AD is an additive masterbatch comprising 56.6 wt.-% of a polypropylene homopolymer for general purpose injection moulding, free of slip and antiblock agents and without calcium stearate, comprising 500 ppm precipitated calcium carbonate (Socal U1S1, distributed by Solvay Chemicals) as particulate acid scavenger, with MFR (230° C./2.16 kg) of 2.0 g/10 mm and a density of 905 kg/m$^3$, 33.3 wt.-% of carbon black, 6.6 wt.-% of Irganox 1010 FF by BASF, and 3.3 wt.-% of Kinox-68 G by HPL Additives.

PP1, E1, E2a, E2b, E2c, talc and the additive masterbatch AD were melt blended on a co-rotating twin screw extruder TSE 24 in amounts as indicated in Table 2. The polymer melt mixture was discharged and pelletized.

TABLE 2

Composition and properties of the inventive and comparative examples

|  |  | CE1 | IE1 | 1E2 | REF |
|---|---|---|---|---|---|
| PP1 | [wt.-%] | 53.0 | 53.0 | 53.0 | 53.0 |
| E1 | [wt.-%] | 24.0 | 20.0 | 20.0 | — |
| E2a | [wt.-%] | — | 4.0 | — | — |
| E2b | [wt.-%] | — | — | 4.0 | — |
| E2c | [wt.-%] | — | — | — | 24.0 |
| Talc | [wt.-%] | 20.0 | 20.0 | 20.0 | 20.0 |
| AD | [wt.-%] | 3.0 | 3.0 | 3.0 | 3.0 |
| MFR (230° C., 2.16 kg) | [g/10 min] | 18.0 | 25.0 | 31.0 | 30.0 |
| Charpy NIS 23° C. | [kJ/m$^2$] | 7.5 | 31.6 | 11.8 | 50.6 |
| Charpy NIS −30° C. | [kJ/m$^2$] | 2.92 | 3.31 | 3.27 | 6.19 |
| Radial Shrinkage Disc | [%] | 0.91 | 1.03 | 1.01 | 1.05 |
| MSE | [-] | 8.4 | 8.4 | 5.4 | 3.7 |
| Tensile Modulus | [MPa] | 2235 | 2043 | 2084 | 1642 |
| Tensile Stress at Yield | [MPa] | 22.5 | 21.6 | 21.9 | 20.3 |
| Tensile Strain at Yield | [%] | 3.5 | 4.1 | 4.2 | 6.6 |
| Tensile Strength | [MPa] | 22.5 | 21.6 | 21.9 | 20.3 |
| Tensile Strain at Break | [%] | 25 | 15 | 16 | 62 |

TABLE 3

Ductile-brittle transitions according to ISO6603-2 evaluation
(The brittle-ductile transition temperature (TBDT) at which breaking mode 1 or 2 is observed for the first time is marked with astericks in the table).

| T [° C.] | CE1 | IE1 | IE2 | REF | ny | 4 | no yielding |
|---|---|---|---|---|---|---|---|
| −40 | 4 | 4 | 4 | 4 | yfuc | 3 | yielding followed by unstable cracking |
| −38 | 4 | 4 | 4 | 4 | yfsc | 2 | yielding followed by stable cracking |
| −36 | 4 | 4 | 4 | 4 | yfdd | 1 | yielding followed by ductile deformation |
| −34 | 4 | 4 | 4 | 3 |  |  |  |
| −32 | 4 | 3 | 4 | 4 |  |  |  |
| −30 | 4 | 4 | 4 | 3 |  |  |  |
| −28 | 4 | 4 | 4 | 4 |  |  |  |
| −26 | 4 | 3 | 4 | 3 |  |  |  |
| −24 | 4 | 4 | 4 | 3 |  |  |  |
| −22 | 4 | 3 | 4 | 3 |  |  |  |
| −20 | 4 | 3 | 4 | 3 |  |  |  |
| −18 | 4 | 3 | 4 | 3 |  |  |  |
| −16 | 4 | 3 | 3 | 3 |  |  |  |

TABLE 3-continued

Ductile-brittle transitions according to ISO6603-2 evaluation
(The brittle-ductile transition temperature (TBDT) at which breaking mode 1 or 2 is observed for the first time is marked with astericks in the table).

| | | | | |
|---|---|---|---|---|
| −14 | 4 | 3 | 3 | 3 |
| −12 | 4 | 4 | 3 | 3 |
| −10 | 4 | *2* | 3 | *2* |
| −8 | 4 | 3 | 3 | 3 |
| −6 | 4 | 2 | 3 | 2 |
| −4 | 4 | 2 | 3 | 2 |
| −2 | 3 | 2 | *2* | 2 |
| 0 | 3 | 2 | 3 | 2 |

TABLE 4

Ductile-brittle transitions according to General Motors evaluation.
(The brittle-ductile transition temperature (TBDT) at which breaking mode of 5 or higher is observed for the first time is marked with astericks in the table).

| T [° C.] | CE1 | IE1 | IE2 | REF | | | | |
|---|---|---|---|---|---|---|---|---|
| −40 | 10 | 9 | 10 | 10 | 09 FD | 9 | fragile | |
| −38 | 9 | 9 | 9 | 10 | 08 FD | 8 | | |
| −36 | 10 | 10 | 9 | 10 | 07 DF | 7 | fragile-ductile | |
| −34 | 9 | 10 | 10 | 10 | 06 DF | 6 | ductile-fragile | |
| −32 | 9 | 10 | 10 | 10 | 05 D | 5 | ductile | |
| −30 | 10 | 10 | 9 | 10 | 04 D | 4 | | |
| −28 | 10 | 10 | 10 | 10 | 03 D | 3 | | |
| −26 | 9 | 10 | 10 | 10 | 02 D | 2 | | |
| −24 | 9 | 10 | 10 | 10 | 01 D | 1 | | |
| −22 | 9 | 10 | 10 | 10 | | | | |
| −20 | 9 | 10 | 10 | 10 | | | | |
| −18 | 9 | 10 | 10 | 10 | | | | |
| −16 | 9 | 10 | 10 | 10 | | | | |
| −14 | 9 | 10 | 10 | 10 | | | | |
| −12 | 10 | 10 | 10 | *6* | | | | |
| −10 | 10 | 6 | 10 | 4 | | | | |
| −8 | 10 | 80 | 10 | 10 | | | | |
| −6 | 10 | *6* | 10 | 4 | | | | |
| −4 | 10 | 4 | *10* | 4 | | | | |
| −2 | 10 | 4 | 4 | 4 | | | | |
| 0 | 10 | 4 | 6 | 2 | | | | |

As can be gathered from Tables 3 and 4, the compositions according to the inventive examples IE1 and IE2 show an IPT performance at low temperatures comparable with the reference example REF containing a styrene based rubber as modifier.

The invention claimed is:

1. A polypropylene composition (C) having a melt flow rate MFR$_2$ (230° C., 2.16 kg) determined according to ISO 1133 in the range of 15.0 to 40.0 g/10 min, comprising:
   i) 45.0 to 80.0 wt. % of a matrix (M) comprising a propylene polymer (PP1),
   ii) 15.0 to 40.0 wt. % of an elastomeric fraction (E) dispersed within said matrix (M), comprising
   a) a first elastomeric ethylene copolymer (E1) having an ethylene content of at least 30.0 mol %, and
   b) a second elastomeric ethylene copolymer (E2) having an ethylene content equal or below 30.0 mol %, and
   iii) an inorganic filler (F).

2. The polypropylene composition (C) according to claim 1, wherein the elastomeric fraction (E) comprises the first elastomeric ethylene copolymer (E1) and the second elastomeric ethylene copolymer (E2) in a weight ratio of 2:1 to 10:1.

3. The polypropylene composition (C) according to claim 1, comprising:
   i) 45.0 to 65.0 wt. % of the propylene polymer (PP1),
   ii) 10.0 to 32.0 wt. % of the first elastomeric ethylene copolymer (E1),
   iii) 0.5 to 10.0 wt. % of the second elastomeric ethylene copolymer (E2), and
   iv) 15.0 to 30.0 wt. % of the inorganic filler,
   based on the overall amount of the polypropylene composition (C).

4. The polypropylene composition (C) according to claim 1, wherein the propylene polymer (PP1):
   i) is a propylene homopolymer (H-PP1) and/or
   ii) has a melt flow rate MFR$_2$ (230° C., 2.16 kg) determined according to ISO 1133 in the range of 20.0 to 200.0 g/10 min.

5. The polypropylene composition (C) according to claim 1, wherein the first elastomeric ethylene copolymer (E1) is a copolymer of ethylene and a C4 to C20 α-olefin.

6. The polypropylene composition (C) according to claim 5, wherein the first elastomeric ethylene copolymer (E1) has:
   a) a melt flow rate MFR (190° C., 2.16 kg) measured according to ISO 1133 below 100.0 g/10 min,
   b) a C4 to C20 α-olefin content, based on the total weight of the first elastomeric ethylene copolymer (E1), in the range of 5.5 to 30.0 mol %, and/or
   c) a density below 0.885 g/cm$^3$.

7. The polypropylene composition (C) according to claim 5, wherein the first elastomeric ethylene copolymer (E1) is a copolymer of ethylene and 1-butene or 1-octene.

8. The polypropylene composition (C) according to claim 1, wherein the second ethylene copolymer (E2) is a copolymer of propylene and ethylene.

9. The polypropylene composition (C) according to claim 8, wherein the second ethylene copolymer (E2) has:
   a) a propylene content of at least 60.0 mol %,
   b) a density below 0.870 g/cm$^3$, and/or
   c) a melt flow rate MFR (190° C., 2.16 kg) measured according to ISO 1133 in the range of 0.5 to 15.0 g/10 min.

10. The polypropylene composition (C) according to claim 1, wherein the inorganic filler (F) is talc.

11. The polypropylene composition (C) according to claim 1, wherein the first elastomeric ethylene copolymer (E1) and the second ethylene copolymer (E2) do not contain monomer units derivable from styrene or derivatives thereof.

12. An article comprising the polypropylene composition (C) according to claim 1.

13. The article according to claim 12, wherein the article is a moulded article.

14. The article according to claim 12, comprising at least 60 wt. % of the polypropylene composition (C).

* * * * *